_United States Patent_ [19]

Donaldson et al.

[11] 3,929,643

[45] *Dec. 30, 1975

[54] FLUID DIVERTER DEVICE WITH PRESSURE RELIEF VALVE

[75] Inventors: Desmond M. Donaldson, Halton; Gregory S. T. Millard, Peel, both of Canada

[73] Assignee: Borg-Warner Corporation, Chicago, Ill.

[*] Notice: The portion of the term of this patent subsequent to Jan. 21, 1992, has been disclaimed.

[22] Filed: May 28, 1974

[21] Appl. No.: 473,615

Related U.S. Application Data

[63] Continuation-in-part of Ser. No. 351,755, April 16, 1973, Pat. No. 3,862,037.

[52] U.S. Cl. ............... 210/117; 210/133; 210/168; 210/181; 210/DIG. 17
[51] Int. Cl.² ............................................ B01B 23/20
[58] Field of Search .......... 210/152, 181, 186, 168, 210/440, 443, 232, 456, 479, DIG. 17, 117, 130, 133, 137; 184/6.24, 104 B; 165/119; 236/34.5

[56] References Cited
UNITED STATES PATENTS

| | | |
|---|---|---|
| 1,818,392 | 8/1931 | Hans.............................. 210/117 X |
| 2,087,887 | 7/1937 | Gesner........................... 210/168 X |
| 2,253,685 | 8/1941 | Burckhalter...................... 210/133 |
| 3,463,317 | 8/1969 | Prier.............................. 210/186 X |
| 3,726,262 | 4/1973 | Moon............................. 210/DIG. 17 |
| 3,824,980 | 7/1974 | Hollins......................... 184/104 B X |
| 3,830,289 | 8/1974 | Olson............................ 165/119 X |
| 3,845,751 | 11/1974 | Runstetler...................... 210/168 X |
| 3,862,037 | 1/1975 | Donaldson et al................. 210/152 |

_Primary Examiner_—Roy Lake
_Assistant Examiner_—Craig R. Feinberg
_Attorney, Agent, or Firm_—James A. Geppert

[57] ABSTRACT

A fluid diverter device positioned in the fluid path flowing between a fluid source and a fluid treating unit and designed to divert the fluid stream to a fluid processing apparatus and return the processed fluid back to the original fluid path. The diverter device includes a conduit structure having an inlet and an outlet extending between the device and the fluid processing apparatus and a pressure relief valve adapted to open under a predetermined pressure to by-pass the fluid around the fluid processing apparatus and direct the fluid through the diverter to the fluid treating unit until such pressure is reduced to an acceptable level.

10 Claims, 5 Drawing Figures

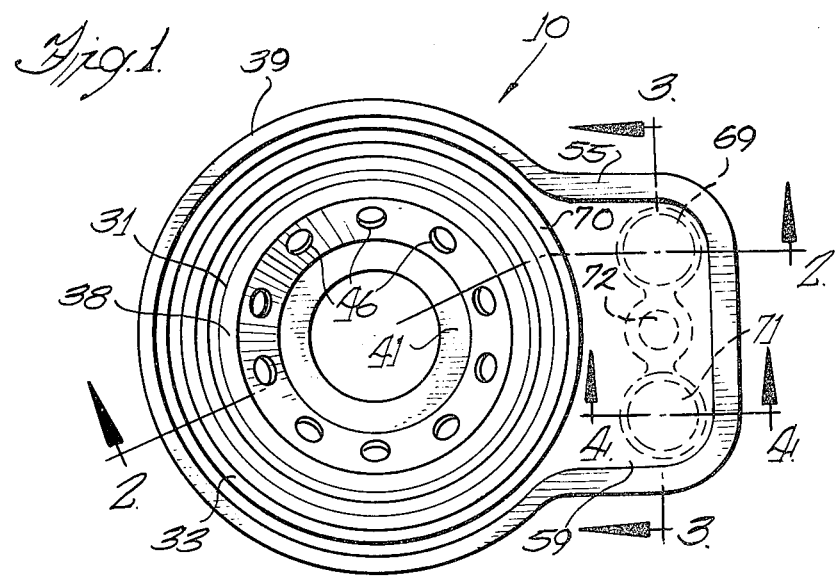
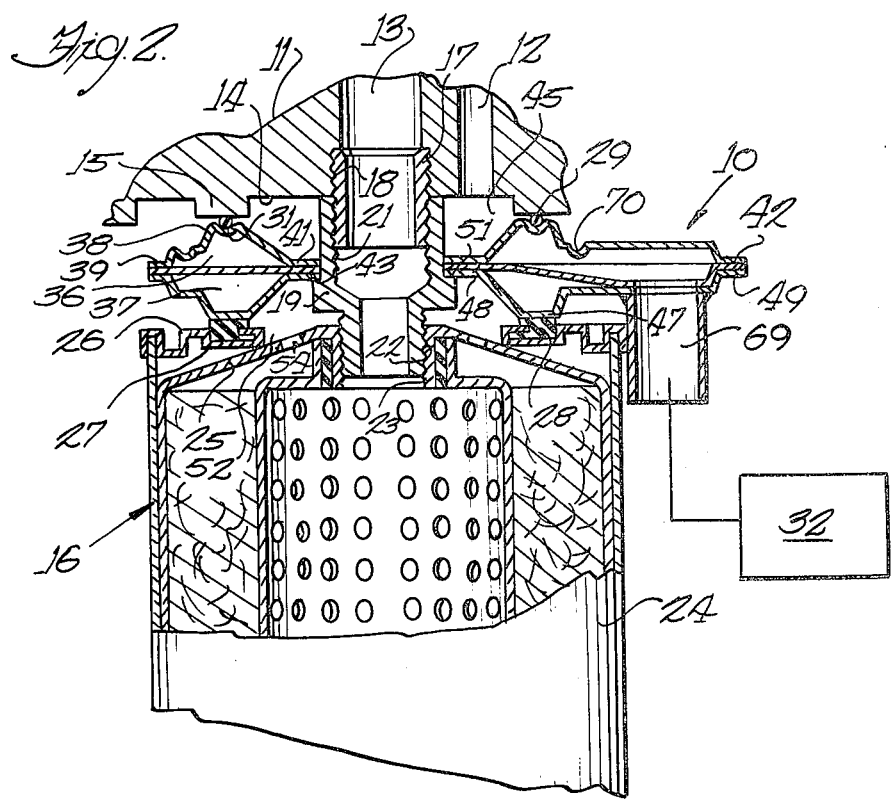

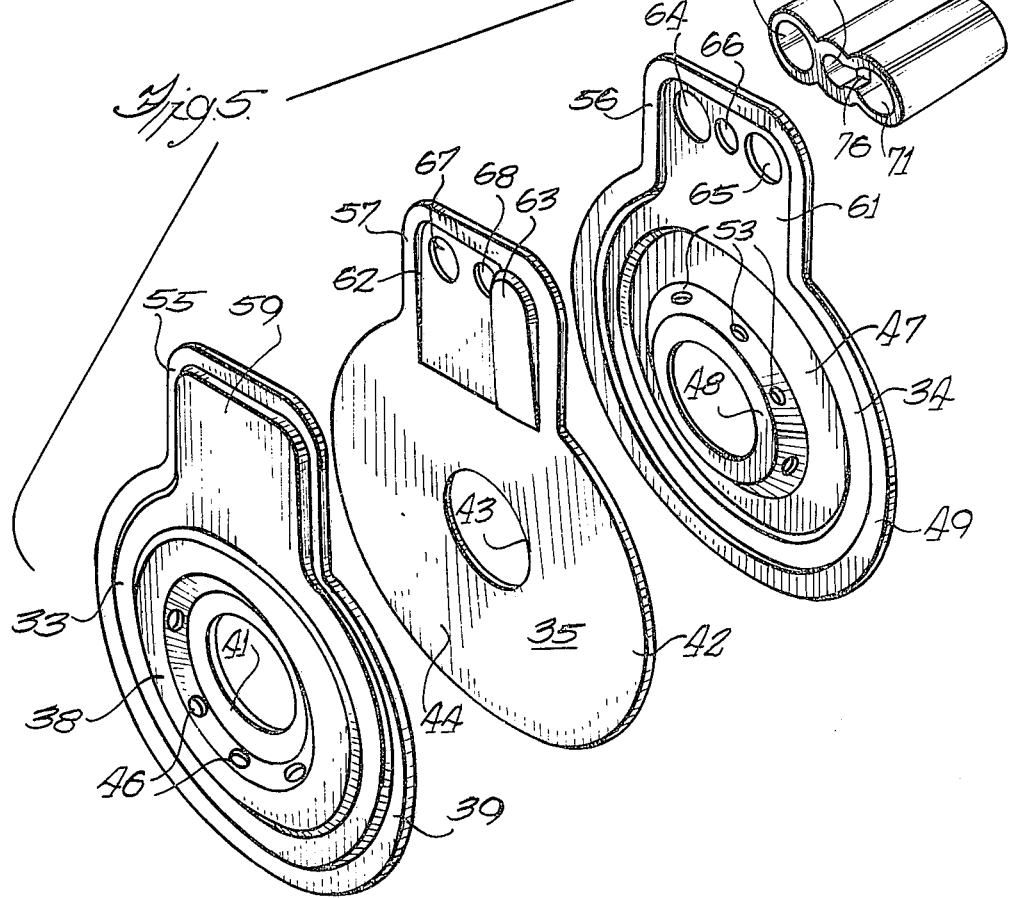

FLUID DIVERTER DEVICE WITH PRESSURE RELIEF VALVE

CROSS-REFERENCE TO RELATED APPLICATION

This application is a continuation-in-part of Ser. No. 351,755, filed Apr. 16, 1973, by Desmond McIntosh Donaldson and Gregory Stephen Truscott Millard and entitled "Fluid Diverter Device," now U.S. Pat. No. 3,862,037.

BACKGROUND AND SUMMARY OF THE INVENTION

The present invention relates to an improved fluid diverter device operable to divert fluid from a flow path for observation, testing, and/or treatment and to return the fluid to the original flow path, and more particularly to a fluid diverter device having a pressure relief valve operable to by-pass the fluid around the apparatus utilized for the observation, testing, and/or treatment under an unacceptable increase in pressure.

In many hydraulic or other fluid flow systems, the systems connect fluid usage and/or treating units, and it is frequently desirable to divert the fluid issuing from one unit to an apparatus for observation, testing, and/or treatment and then to return the fluid to the other unit. One arrangement consists in diverting a stream of lubricating oil of an internal combustion engine to a temperature-regulating heat exchanger to insure satisfactory flow and lubricating properties of the oil prior to flow of the oil stream through a filter for clarifying and purifying the oil. For this purpose, the diverter may be in the form of an adapter unit making it possible, in a closed engine lubricating arrangement having a spin-on type of oil filter, to add a cooling device to an existing filter system without altering the filter or the engine to which the filter is usually attached.

While such adapter units have been satisfactory for their intended use, these prior units are composed of die-cast or forged structures of a complex configuration to define the fluid passages and ports; such structures requiring numerous and careful machining and drilling operations, with consequent expensive manufacturing costs. In addition, car manufacturers employ different engines so that it was previously necessary to provide several models of adapter units to insure proper individual fitting of the adapter units to the engines. Also, such known adapter units are bulky and, since space limitations are critical for accommodating and mounting adapter units relative to the engines and filters, the compactness of an adapter unit is imperative. An improved form of adapter is shown in our copending patent application Ser. No. 351,755, filed Apr. 16, 1973 now U.S. Pat. No. 3,862,037.

Where an adapter unit is utilized in conjunction with a heat exchanger or cooler for the lubricating oil of an engine or transmission, further problems arise where the engine is initially started and the engine oil is cold and viscous. The oil remaining in the engine or transmission will be rapidly warmed due to the operation of the engine, however, the cold oil remaining in the heat exchanger when the engine is not running will be warmed at a much slower rate, and the higher viscosity of the cold oil in the heat exchanger will cause a pressure increase as oil is pumped to the fluid diverter. Thus, a means of by-passing the heat exchanger is necessary until the oil within the heat exchanger has been warmed sufficiently to flow freely. The present invention obviates the problems involved in such pressure build-up due to cold, viscous oil in the heat exchanger.

Among the objects of the present invention is the provision of an improved fluid diverter device for diverting fluid from a predetermined flow path to a processing apparatus, such as a heat exchanger, and returning the fluid to the original flow path. More specifically, the fluid diverter device is especially adapted to be positioned between and connected to an automotive engine and a lubricant oil filter and operative to divert oil from the engine to a heat exchanger for conditioning the temperature of the oil and to return the conditioned oil to the diverter and oil filter.

Another object of the present invention is the provision of an improved fluid diverter device of simple and inexpensive construction comprising three main component members, which may be formed of thin plastic or sheet metal stampings, including substantially identically formed closure members and a baffle member disposed between the closure members to provide spaced fluid chambers forming flow passages respectively connected to and in communication with supply and return ports in one of the closure members. The device is adapted to have one of its closure members sealingly engage an engine block and be provided with openings for passage of engine lubricant into one of the compartments for flow to the supply port leading to a heat exchanger for temperature conditioning; the conditioned oil returning through the return port to the other compartment connected to an oil filter. The control device has a threaded fitting interconnecting the filter and engine for flow of filtered oil to the engine, and radially spaced seals in the closure members are provided to universally adapt the device to engage one or the other of different sized oil filter mounting openings on the engine and to the oil filter structure.

A further object of the present invention is the provision of an improved fluid diverter device having the supply passage therefrom and the return passage thereto formed in an unitary member which is suitably secured to the fluid diverter construction; the unitary member further including a by-pass arrangement so that fluid flow can be directed from the supply passage to the return passage without passing through the heat exchanger. A pressure relief valve is located in the unitary member and controls a relief port that is opened upon an increase in pressure above a predetermined level to by-pass the circulating fluid from the supply passage to the return passage. The pressure relief valve is yieldably biased to close the above mentioned port, and means are provided to adjust the pressure level at which the relief valve opens.

Further objects are to provide a construction of maximum simplicity, efficiency, economy and ease of assembly and operation, and such further objects, advantages, and capabilities as will later more fully appear and are inherently possessed thereby.

DESCRIPTION OF THE DRAWINGS

FIG. 1 is a top plane view of the improved fluid diverter device of the present invention;

FIG. 2 is a partial vertical cross sectional view taken on the irregular line 2—2 of FIG. 1 showing, in addition, the diverter interposed between the filter and engine block;

FIG. 3 is a vertical cross sectional view taken on the line 3—3 of FIG. 1;

FIG. 4 is a partial vertical cross sectional view taken on the line 4—4 of FIG. 1; and FIG. 5 is an exploded perspective view of the improved fluid diverter device including the pressure relief valve.

DESCRIPTION OF THE PREFERRED EMBODIMENT

Referring to the disclosure in the drawings wherein is shown an illustrative embodiment of the present invention, FIGS. 1 and 2 disclose a fluid diverter device 10 which is adapted to be positioned in close proximity to a standard automotive engine block 11 having a lubricating oil system including oil passages 12 and 13 communicating with a circular pocket 14 defined by an annular collar 15 integral with the block 11. The passage 12 in the block 11 is connected to an engine oil pump (not shown) for conducting oil under pressure into the pocket 14. The passage 13 is located centrally of the circular pocket 14 and is connected to a conventional oil filter 16 by a nipple 17 in threaded engagement with a bore 18 in block 11 at the end of passage 13 and by a tubular connector fitting 19 forming a component part of device 10 and having an internally threaded cylindrical portion 21 in engagement with the nipple 17 and an exteriorly threaded reduced cylindrical portion 22 screwed into the internally threaded bore 23 in the oil filter 16.

The oil filter 16 is of a conventional design having a cylindrical side wall 24 with the upper end defined by a sloping wall 25 terminating at its inner periphery in the threaded bore 23 and a generally horizontally arranged irregularly shaped wall 26 forming a grooved portion 27 to receive a suitable compressible gasket ring 28 sealingly engaging the diverter device 10. An O-ring 29 is seated in an annular groove 31 in the upper surface of the diverter device 10 and engages the collar 15 to provide a seal between the engine block 11 and device 10. The engine block 11, oil filter 16 and device 10 are thus held in assembly by their described connection to each other and for a purpose that will become apparent from the following description of the specific construction and function of the fluid diverter device.

The fluid diverter device 10 is designed to divert lubricating oil, normally flowing in a predetermined flow path from the engine to the filter 16, from this flow path by conducting the oil from the engine to a processing apparatus 32 which, in the present example, is a heat exchanger or oil cooler for conditioning the temperature of the oil, and transfer of the oil to the oil filter 16 for filtration and return to the engine. More specifically, the fluid diverter device 10 comprises a hollow casing provided by a pair of substantially identical closure members or dished plates 33 and 34; a baffle member or plate 35 being positioned in the casing between the closure members and forming therewith upper and lower annular fluid chambers 36 and 37. The closure member 33 is formed as an annular dished plate providing a crown 38, radially outer and inner flat rims 39 and 41 of the plate engaging complementary rims 42 and 43 of the flat body portion 44 of the annular baffle member or plate 35 to thereby define the upper fluid cmpartment 36. The crown 38 of the closure member 33 is provided with annular groove 31 for O-ring 29 engaging the collar 15 of the engine block 11 to prevent leakage of oil from a fluid compartment 45 formed by crown 38, engine block 11 and nipple 17.

The crown 38 of closure member 33 is provided with a plurality of openings 46 in annular array for passage of oil from compartment 45 to chamber 36. Closure member 34 is a dished plate formed in a similar plastic mold or sheet metal die as the plate 33 and, accordingly, has an annular crown 47, and radially inner and outer flat rims 48 and 49 engaging complementary rims of the flat body portion 44 of the baffle plate 35 to define the lower fluid chamber 37. The inner rim 48 of closure member 34 is seated on and is in fluid-tight engagement with a shoulder 51 on the fitting 19. The crown 47 engages gasket 28 and defines, with fitting 19 and walls 25 and 26 of the filter 16, a fluid compartment 52 in communication with the lower chamber 37 and the interior of the filter 16 via openings 53 in the crown 47 and openings 54 in the sloping wall 25 of the filter 16.

The single baffle member or plate 35 is effective to provide two distinct and separate fluid chambers 36 and 37 in the fluid diverter device, with the chamber 36 receiving lubricating oil from the engine via the compartment 45; the oil flowing to the heat exchanger 32 for cooling. The chamber 37 is connected to the outlet for the heat exchanger and receives the cooled oil for transfer via compartment 52 to the oil filter 16. To provide for the flow of oil through and from the fluid diverter device 10, the closure plates 33 and 34 and the baffle plate 35 are formed with coextensive engaged tabs 55, 56 and 57, respectively, projecting from the crowns 38 and 47 and the body portion 44 and formed to provide fluid passages from chambers 36 and 37 to a conduit member 58 fluid sealingly secured to the plate 34 and communicating with the heat exchanger 32. Tab 55 on the closure member 33 is upwardly embossed at 59, the tab on closure member 34 is downwardly embossed as at 61, and the baffle member 35 has a downwardly extending embossment 62 and an upwardly extending embossment 63 formed thereon; the embossment 63 being approximately one-half the width of the embossment 62. Adjacent the outer edge of the tab 56, a supply port 64, a return port 65 and an intermediate relief port 66 are formed in the embossment 61. Also, in the downward embossment 62 on tab 57, a supply port 67 and a relief port 68 are positioned to be aligned with the supply port 64 and relief port 66 on the tab 56; the embossment 62 adjacent the ports being sealingly secured to the embossment 61 on the tab 56.

The conduit member 58 includes a one-piece body having a supply passage 69 from the diverter device 10 and a parallel return passage 71 to the device extending therethrough; the passages being aligned with the supply port 64 and the return port 65 in the tab 56. A central or intermediate parallel passage 72 houses a pressure-relief ball valve 73 biased to close the relief port 66 by a compression spring 74 received in the passage 72 and retained therein by a retaining plug 75 threadingly engaging the outer end of the passage 72. The outer ends of the supply passage 69 and the return passage 71 are connected by suitable conduits to the inlet and outlet, respectively, of the heat exchanger 32. A cross-over port 76 is formed in the upper end of the member 58 and communicates between the intermediate passage 72 and the return passage 71 to provide a by-pass of fluid around the heat exchanger.

The fluid control device 10 of the present invention, due to the simplicity of its components, can be readily and inexpensively manufactured since the closure and baffle plates can be molded of plastic and connected together, or may be sheet metal stampings formed of a suitable metal, such as aluminum, and connected together by an aluminum bonding process, and the conduit member is preferably formed as an extrusion. The closure plates 33 and 34 are formed identically and used in inverted pairs after performing additional minor operations, which include a forming of grooves 31 and 70 in the upper plate 33 and providing the openings or ports 64, 65 and 66 in the embossment 61 of the lower plate 34. The closure and baffle plates are selflocating for easy assembly. The assembly is sufficiently compact for accommodation in locations having critical space limitations, and the baffle plate provides the multiple functions of interrupting and separating the incoming oil from the outgoing oil since it cooperates with the closure plates 33 and 34 to provide the upper and lower chambers 36 and 37, and serves, in effect, as two baffles bridged to permit manufacture of the single piece.

In addition, the grooves 31 and 70 in the upper closure member 33 provide alternate O-ring locations suitable for adaptation of the device to substantially all American vehicle engines. Another important feature is that the inlet and outlet passages in the member 58 are parallel to the axis of the oil filter. Obviously in environments where space permits or makes it desirable, the conduit member 58 may be designed to extend in the direction of the plane of the baffle plate 35.

Considering the operation of this device 10 positioned between the engine block 11 and the oil filter 16, lubricating oil is pumped from the engine through the oil passage 12 to the fluid compartment 45 and passes through the openings 46 in the upper closure member 33 to enter the upper annular chamber 36 and move into the embossment 59 on the tab 55. The oil then passes through the supply ports 64 and 67 the supply passage 69 and the heat exchanger 32 wherein the oil is cooled. The cooled oil flows through the return passage 71 into the return port 65 and the embossment 61 on the tab 56; the upward embossment 63 on the tab 57 directing the oil into the lower annular chamber 37. The oil then passes through the openings 53 in the crown 47 of the lower closure member 34 and the openings 54 in the wall 25 to enter the oil filter 16. Oil from the filter 16 enters the tubular connector fitting 19 and passes through the nipple 17 to enter the oil passage 13 and return to the engine.

When the engine is cold, the oil is relatively viscous and any oil retained in the heat exchanger will resist flow. Thus, when the oil heated by initial operation of the engine enters the upper chamber 36 to pass through the supply port 64, the pressure due to the sluggish oil in the heat exchanger will result in an increase in pressure in the chamber 36. The pressure relief ball valve 73 is yieldably urged by the compression spring 74 to normally close the relief port 66, but when the pressure in the chamber 36 rises to a predetermined level, the oil in this chamber also communicating with the relief port 66 in the downward embossment 62 acts to unseat the ball valve 73 and allow the oil to pass through the relief port 66 and enter the intermediate passage 72. This oil passes through the cross-over port 76 to the return passage 71 and into the return port 65 to by-pass the heat exchanger 32. The oil by-passing the heat exchanger will then immediately enter the oil filter as previously described to be filtered and returned to the oil passage 13. The by-pass operation will continue until the oil in the heat exchanger 32 is sufficiently heated due to its close proximity with the engine to allow the oil to freely flow therein, whereupon the pressure in the chamber 36 will decrease to allow the ball valve to reseat and close the relief port 66. The oil diverter will then resume normal operation as previously described.

While the improved fluid diverter device has been disclosed in a preferred embodiment of the invention as diverting lubricant oil from its normal flow path between an engine and filter to a heat exchanger for the control of the temperature of the oil, and its return to filter, it is believed that the fluid diverter device may be utilized in many other applications requiring diversion of fluids other than oil from a predetermined flow path to a processing or treating apparatus and return of the fluid to the original flow path, and where an increase in pressure in the processing apparatus may require a by-pass around such apparatus during selected intervals of operation.

We claim:

1. A fluid diverter device adapted to be disposed in a fluid flow path to divert fluid to a fluid treating apparatus and return the fluid to its original path, comprising first and second dished plates defining a hollow casing, said first plate having inlet means for flow of fluid into said casing and said second plate having outlet means for flow of fluid from said casing, a baffle plate disposed between and engaging said casing plates and dividing said casing to provide spaced independent first and second fluid chambers respectively communicating with said inlet and outlet means, said plates having coextensive engaged tab portions, the tab portions of said first and second plates extending from said fluid chambers and overlying and being in spaced relation to the tab portion of said baffle plate to provide spaced fluid passages therein, spaced conduit means respectively connected to said spaced fluid passages defined by said tab portions for flow of fluid from said first chamber to said fluid treating apparatus and for flow of fluid from said apparatus to said second chamber, and means to by-pass the fluid treating apparatus and cause liquid flow directly from said first chamber to said second chamber.

2. A fluid diverter device as set forth in claim 1, in which said spaced conduit means are located in a unitary conduit member having parallel spaced supply and return passages extending therethrough, said tab portion of said second plate having spaced openings aligned and communicating with said last mentioned passages.

3. A fluid diverter device as set forth in claim 2, in which said by-pass means includes an intermediate passage formed in said conduit member between and extending parallel to said spaced supply and return passages, said lower tab portion having a relief port positioned between said spaced openings and in fluid communication with said intermediate passage, said conduit member being secured in fluid sealing engagement with said lower tab portion.

4. A fluid diverter device as set forth in claim 3, including a pressure relief valve located in said intermediate passage and normally closing said relief port in said lower tab portion, and said conduit member having a cross-over port extending between said intermediate passage and said return passage adjacent said lower tab portion and controlled by the pressure relief valve.

5. A fluid diverter as set forth in claim 4, in which said pressure relief valve includes a ball valve yieldably biased against said relief port, and a retainer positioned in the opposite end of said conduit member to close the opposite end of said intermediate passage.

6. A fluid diverter device as set forth in claim 3, in which said tab portion of said baffle plate includes a downwardly embossed portion and an upwardly embossed portion, said downwardly embossed portion having a pair of openings aligned with and communicating with said relief port and the spaced opening leading to said supply passage in said conduit member.

7. A fluid diverter device as set forth in claim 6, in which said downwardly extending embossed portion sealingly engages said lower tab portion adjacent to said relief port and spaced opening so as to seal said relief ports and spaced openings in said tab portion of said baffle plate and said tab portion of said second plate together.

8. A fluid diverter device as set forth in claim 6, in which said upwardly extending embossment communicates with said other spaced opening to direct fluid from said return passage into said second annular chamber.

9. A fluid diverter device as set forth in claim 7, in which said downwardly extending embossment directs fluid from said first annular chamber to said first mentioned spaced opening and said relief port.

10. A fluid diverter device as set forth in claim 6, wherein said pressure relief valve allows flow of fluid through said relief port and said cross-over port to said return passage and said other spaced opening whenever the pressure in said fluid treating means communicating with said supply and return passages exceeds a predetermined value.

* * * * *